Jan. 15, 1935.  C. E. HOOD  1,987,827
METHOD OF AND APPARATUS FOR PREPARING SOLES FOR BOOTS AND SHOES
Filed Dec. 18, 1931   3 Sheets-Sheet 1
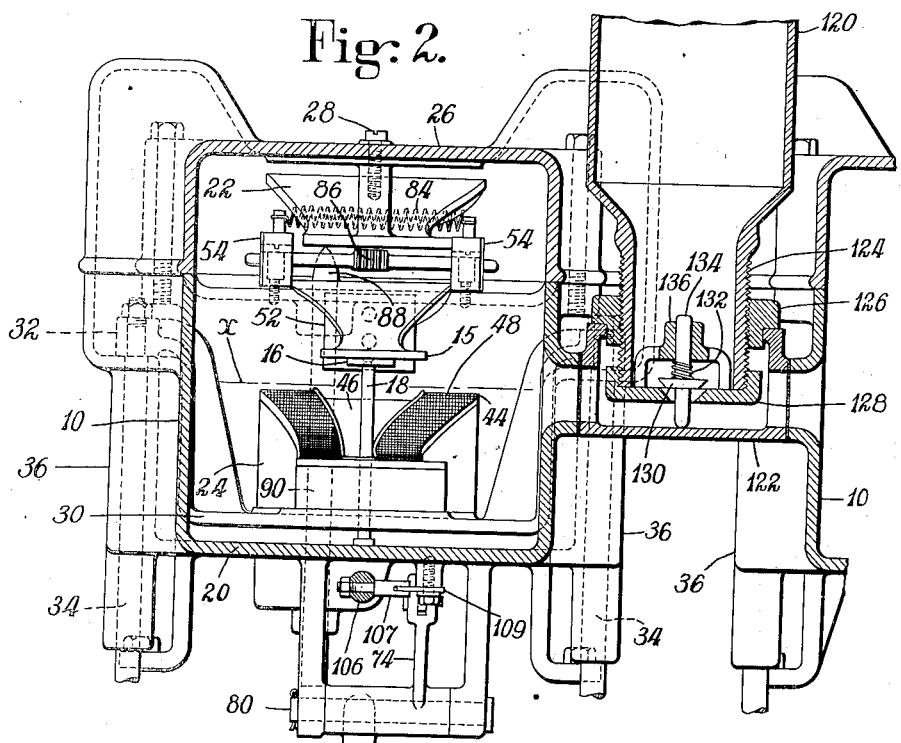
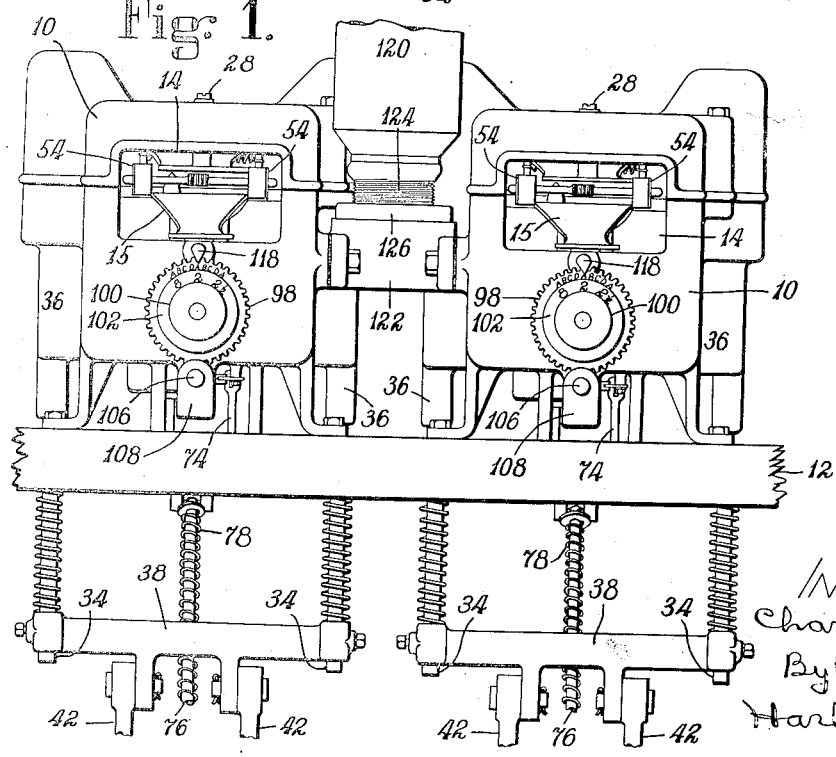

Jan. 15, 1935. C. E. HOOD 1,987,827
METHOD OF AND APPARATUS FOR PREPARING SOLES FOR BOOTS AND SHOES
Filed Dec. 18, 1931 3 Sheets-Sheet 2

INVENTOR
Charles E. Hood
By his Attorney
Harlow M. Davis

Jan. 15, 1935. C. E. HOOD 1,987,827
METHOD OF AND APPARATUS FOR PREPARING SOLES FOR BOOTS AND SHOES
Filed Dec. 18, 1931 3 Sheets-Sheet 3
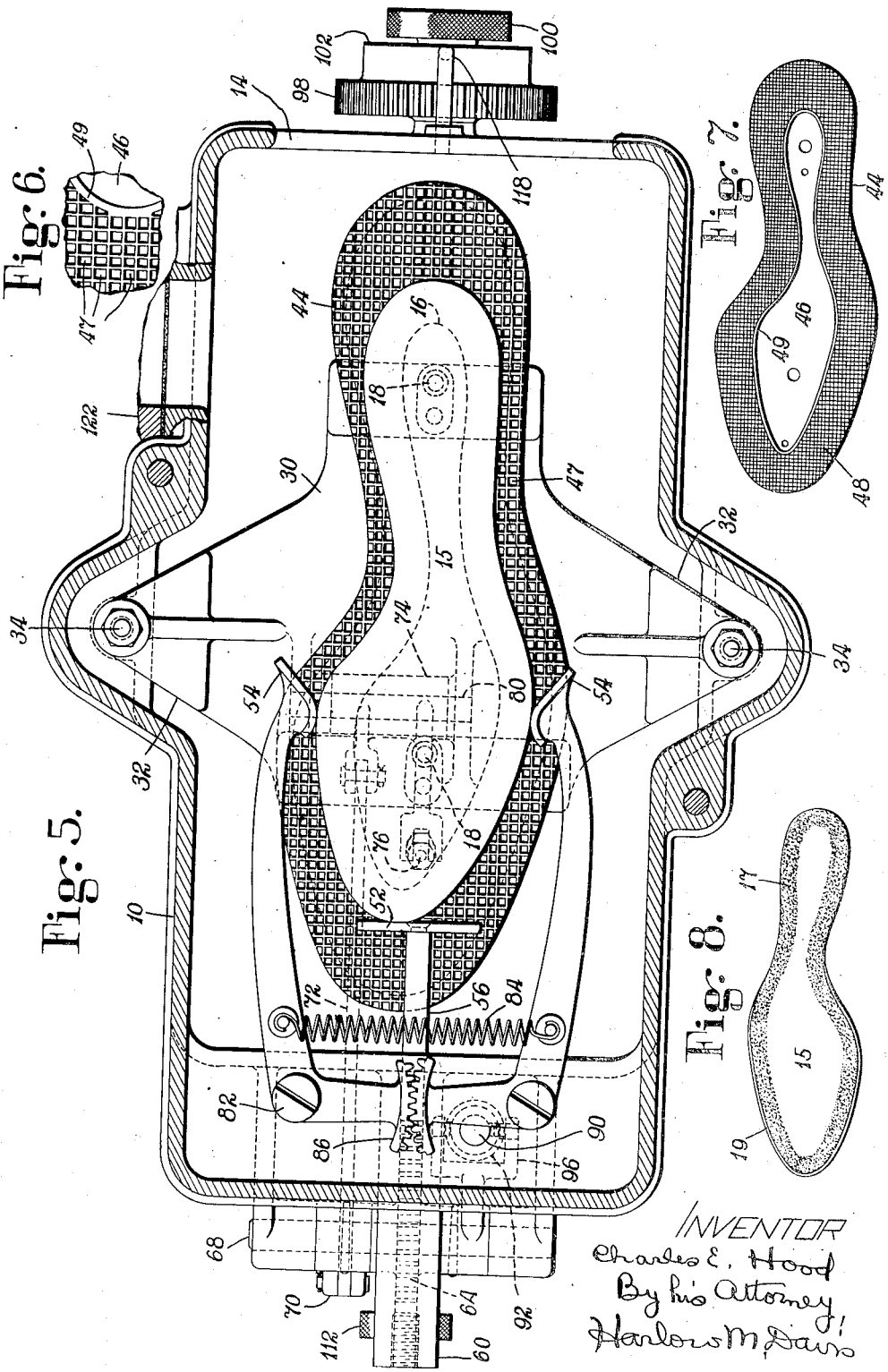
INVENTOR
Charles E. Hood
By his Attorney
Harlow M. Davis Patented Jan. 15, 1935

1,987,827

UNITED STATES PATENT OFFICE 1,987,827

METHOD OF AND APPARATUS FOR PREPARING SOLES FOR BOOTS AND SHOES

Charles E. Hood, Lynn, Mass., assignor to United Shoe Machinery Corporation, Paterson, N. J., a corporation of New Jersey Application December 18, 1931, Serial No. 581,942

14 Claims. (Cl. 12—80)

This invention relates to methods of and apparatus for applying a conditioning liquid to certain restricted areas of unattached soles for boots and shoes, for example, soles intended to be attached by adhesive cement to lasted shoes. The restricted areas above referred to are commonly the marginal areas of the attaching faces of outsoles, that is, the areas that are to lie against the overdrawn margins of the lasted uppers, or, in welted shoes, against the welts thereof. It is to be understood that the expression "sole-conditioning liquid" as used herein may be a liquid adhesive cement or a liquid solvent adapted to revive the tacky condition of an adhesive cement previously applied to soles and partially or completely dried thereon, although the present invention is intended more especially to deal with the operation of applying a liquid solvent to those restricted marginal areas only of unattached soles that have dried coatings of cement on their marginal areas but not elsewhere.

In the manufacture of cemented shoes of certain types an adhesive cement, for example pyroxylin cement, is used to attach leather outsoles, and it is common to prepare such outsoles substantially as follows. A sole is first cut to final configuration; the marginal portion of its attaching face, that is, the flesh face, is roughened to loosen the fibers thereof, the better to afford strong anchorage for the cement subsequently to be applied thereto, the marginal band thus roughened being approximately ½ or ¾ of an inch in width; adhesive cement in liquid form is then applied to the attaching face of the sole and is preferably confined to the roughened marginal band thereof; the cement thus applied is permitted to set or dry sufficiently to enable the soles to be handled and stacked without adhering one to another; and when a sole so prepared is about to be attached to a lasted shoe the cement previously applied to the roughened marginal band is restored to a tacky condition by applying thereto a liquid solvent. Cement is also applied to, and permitted to dry on, the marginal areas of the bottoms of the lasted shoes before outsoles are attached to them. In general, the solvent applied to the cement-coated marginal areas of the outsoles is sufficient to revive the tacky condition of the cement on the bottoms of the lasted shoes, as well as that on the outsoles themselves, although additional solvent may be applied to the shoe bottoms, if desired.

Those skilled in the art of making shoes of the types under consideration understand that cement should not be applied to the middle area of the forepart of a shoe-sole because it would have too much stiffening effect. Moreover, it is in the interest of economy of both cement and solvent to restrict them to the marginal areas of the soles. Again, in non-welted shoes the marginal portions of the outsoles lie in contact with the overdrawn margins of the uppers and commonly project slightly beyond the crease formed by the junction of those elements. To avoid certain objectionable results due to cement on the projecting marginal bands of the outsoles it is common to chamfer these bands after the applied coatings of cement have dried, thereby removing the cement from them before any solvent is applied. Nevertheless, if too much solvent is applied to the remainder of the cement it will restore the latter to a state of fluidity with the result that, when the outsole is pressed against a shoe to secure it, some of the cement will be expelled and will flow onto the marginal band from which cement has been removed. Thus, the purposes in removing cement from this outer band will be defeated.

In view of these conditions an object of the present invention is to provide an improved method of, and improved apparatus for, applying a conditioning liquid to unattached shoesoles, to the end that the quantity of liquid and the distribution thereof may both be accurately controlled.

Accordingly, in one aspect the invention provides an improvement in methods of preparing unattached soles for attachment to shoes, which consists in applying cement to the margin of an unattached sole, allowing the cement to dry, supporting said sole attaching face down by a middle area of that face without masking the marginal area thereof, presenting a sponge-like applicator to apply an excessive quantity of a conditioning liquid to the unmasked marginal area, and expelling surplus liquid from the applicator without coating the middle area.

The expelling of the surplus liquid may occur so soon after the application of liquid to the sole as to be, in effect, a part of, or a continuation of, the liquid-applying step and thus insure even distribution of the liquid in consequence of the compulsory flowing or spreading thereof. Moreover, when a solvent is thus applied to a dried coating of cement previously applied to a sole, the surplus solvent will be expelled before the cement is appreciably softened by the action of the solvent. Consequently, although the sole may be immediately pressed against a shoe to effect its attachment, there will be no more expulsion of solvent or cement, since the quantity of solvent remaining on the cement will be no more than enough to render the cement properly tacky.

Considering the apparatus herein illustrated, a feature of the invention consists in an improved combination comprising means arranged to support an unattached sole face down without masking the marginal area thereof, a pad formed and arranged to apply a liquid to substantially the entire margin of the under face of a sole lying on said supporting means, a platen arranged to engage the upper face of the sole, said sole supporting means lying at a level between the pad and the platen, means for supplying an excessive quantity of a conditioning liquid to the sole-engaging face of the pad, and means for relatively moving the pad and the platen to lift the sole from the supporting means, to clamp the sole and to apply a coating of liquid thereto.

The liquid-applying pad herein illustrated is provided with many small and closely related pockets or depressions in its liquid-applying surface to insure applying more than enough liquid to the area of the work to be conditioned thereby. Thus, when a marginal band of a sole is clamped by the liquid-laden pad and the platen the surplus liquid is caused to flow across the surface of the marginal band in consequence of being expelled from the pad. The flow of surplus liquid thus produced insures application of liquid to every portion of the marginal band in register with the liquid-applying surface of the pad.

Referring to the drawings,

Fig. 1 is a front elevation of a sole-conditioning apparatus embodying the invention and including two conditioning units connected to an intermediate source of conditioning liquid common to both;

Fig. 2 is a vertical cross-section of the left-hand unit included in Fig. 1 and a portion of a barometric feeder by which conditioning liquid is supplied to both units;

Fig. 5 is a horizontal section through the unit represented in Fig. 2 and includes a sole, the parts occupying their initial positions;

Fig. 6 is a top-plan view of a fragment of the liquid-applying pad represented in Fig. 5;

Fig. 7 is a plan view of the liquid-applying pad on a smaller scale; and

Fig. 8 is a plan view of the attaching face of an outsole provided with a marginal band of cement and with a narrow cement-free outer band around its forepart.

Figures 3, 4:
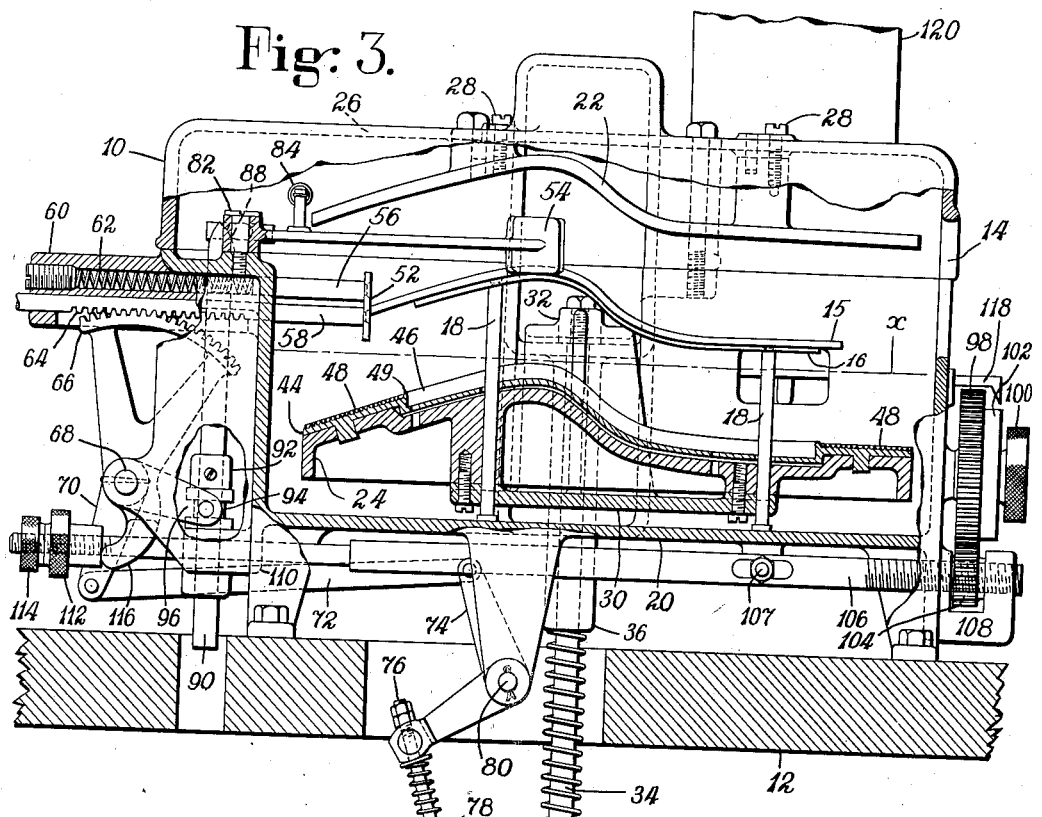
Fig. 3 is a vertical section in a plane from front to rear of one of the units, with a sole positioned therein, the parts being in their initial positions.
Fig. 4 is a vertical cross-section including the sole-pressing members of one of the units in the act of applying liquid and pressure to an interposed sole.

To deal with soles for both right shoes and left shoes, the illustrated apparatus is provided with two individually operative groups of elements designed to be supplied with a sole-conditioning liquid from a source common to both. Each group of operating elements includes a hollow casing 10 forming a closed chamber into which the soles to be conditioned may be inserted and this chamber comprises a basin or receptacle in which the conditioning liquid is confined to retard evaporation thereof. The two casings 10 may be arranged side by side on a suitable support, such as a bench 12. Since the two groups of operating elements are substantially alike except that some of them have configurations corresponding to that of a right sole while others have configurations corresponding to that of a left sole, a description of the details of one of the two groups will suffice for both groups.

Each casing 10 is provided with a restricted opening 14 in its front upright wall for endwise insertion of a sole 15. Preferably, each sole will be inserted toe foremost through this opening and will be placed face down on a support 16 that stands initially at a level in register with the opening. The support 16 is shown as a thin plate of sheet metal suitably curved, as viewed in side elevation, to conform to the facial curvature previously imparted to the soles in the molding thereof, but it is to be understood that the invention is not limited to the conditioning of previously molded soles. Accordingly, it is within the scope of the broader aspects of the invention to practice the methods herein described on flat soles, for example, by using flat supports and flat sole-pressing members instead of the curved supports and curved sole-pressing members herein illustrated.

The sole-support 16 is affixed to the upper ends of two rods or posts 18, the lower ends of which stand on the bottom wall 20 of the casing. The area of the support 16 is considerably smaller than the area of the smallest sole of a range of sizes with which the apparatus is designed to deal, and the configuration of the support resembles that of a sole, see Fig. 5. Consequently, when a sole is placed in the desired position on the support the middle area of its under face will be masked by the support but the marginal portion of that face will project beyond the perimeter of the support and will be exposed to receive the conditioning liquid.

When a sole is placed on the support 16 it lies between two cooperative sole-pressing members, the upper one of which is indicated at 22 and the lower one at 24. These sole-pressing members are relatively movable one toward and from the other and the lower one is utilized to apply a sole-conditioning liquid to the marginal area of the under face of the sole. Moreover, in the illustrated apparatus the upper pressing member 22 is stationary and constitutes a platen, whereas the lower member 24 is movable toward it to apply the conditioning liquid to the sole. The lower member 24 is initially immersed in a body of conditioning liquid contained in the casing below the level of the opening 14, but in rising it picks up the sole and carries it to the stationary pressing member 22 where the lower member 24 with its burden of liquid is applied with considerable pressure to the under surface of the sole. Thereafter, when the lower member 24 descends, it returns the sole to the above-mentioned intermediate level in register with the opening 14, at which level the sole is again supported by the support 16 so that it may be readily removed through the opening.

The two sole-pressing members 22 and 24 embody facial curvatures corresponding to the molded formations previously imparted to molded soles, but, as hereinbefore stated, it would be within the scope of the invention to substitute flat sole-pressing members if it were desired to deal with flat soles.

The upper sole-pressing member is affixed to the upper wall 26 of the casing 10 by screws 28. The lower pressing member 24 is bolted to a saddle or carrier 30, the middle portion of which (see Fig. 2) is below the level of its extremities 32 which project laterally above the level x of the conditioning liquid maintained in the lower portion of the conditioning chamber. The extremities 32 are affixed to the upper ends of two vertical rods 34 arranged to slide in bosses 36 formed on the casing 10 outside the conditioning chamber. These rods extend below the supporting bench 12 and their lower ends are rigidly connected by a cross-bar 38 (Fig. 1) to which operating motion may be imparted by a treadle 40 (Fig. 3) and a pair of connecting links 42.

When the lower pressing member 24 is at the lower limit of its range of travel, it is submerged in the conditioning liquid maintained in the chamber, but when it is raised it emerges from the body of liquid before it encounters the sole lying on the support 16.

As illustrated in Fig. 3, the member 24 is provided with a liquid-applying pad 44, the configuration of which is illustrated in Figs. 5 and 7. This pad is preferably made of some elastic or resilient material, such as rubber or a compound containing rubber, and is provided with a depression or cavity 46 in which the supporting plate 16 may be nested (Fig. 4) and has a ledge on which the plate 16 rests when the pad picks up a sole lying on the plate. The liquid-applying surface 48 of the pad (see Fig. 6) is preferably provided with many small closely related pockets or depressions 47 to give it a sponge-like character the better to carry an excessive quantity of conditioning liquid to insure application of liquid to all portions of a sole that are intended to be treated thereby. The width of the band between the inner and outer boundaries of the liquid-applying surface 48 is preferably so great as to cover the marginal bands of soles of all lengths and widths within the range of sizes commonly required. The inner boundary of the liquid-applying surface is provided with a continuous bead 49 that normally projects slightly above the general plane of that surface and acts as a barrier to prevent liquid from spurting toward the middle area of a sole when surplus liquid is being expelled by clamping pressure of the surface 48 against the marginal band of the sole.

In using the apparatus, the operator, after placing a sole 15 on the support 16, depresses the treadle as far as it will go, permits it to return to its initial position without appreciable dwell at its lower limit, and immediately removes the sole through the opening 14. The upward movement of the bead 49 is arrested by the platen 22 and the interposed sole before the liquid-laden surface 48 is arrested, but as the surface 48 applies clamping pressure to the margin of the sole it causes lateral expulsion of surplus liquid carried in the pockets thereof. The expelled liquid is thus compelled to flow outwardly across the margin of the sole, since the bead 49 provides a dam to prevent flow toward the middle area of the sole. The flowing of liquid thus produced across the marginal band of the under face of the sole insures the application of liquid to all portions of said band. Consequently, when applying a solvent in this manner to a dried coating of cement on a sole, the surplus solvent will be expelled before the cement can be softened enough to be displaced from its original location on the sole. For example, the foreparts of cement-coated soles are commonly beveled after the cement has dried but before solvent is applied to them, the purpose of the beveling being to remove the cement from narrow outer bands of their attaching faces. A sole so prepared is illustrated in Figs. 4 and 8 in which a band of dried cement is indicated at 17 and the cement-free outer band is indicated at 19. Now, in applying solvent to the dried cement 17 with the apparatus above described, all surplus solvent is expelled from the pad before the cement is appreciably softened by the solvent and the sole may be removed from the apparatus without any flowing of cement to the outer band 19 and with only enough solvent remaining on the cement to insure tackiness of the latter.

The sole-supporting plate 16 is maintained in register with the opening or cavity 46 in the pad by the rods 18. As shown in Fig. 3, these rods extend through bearings 50 formed in the lower presser member 24, in which bearings the rods are free to slide. When the member 24 is rising from its initial position to the intermediate level at which a sole is initially supported, the bearings 50 slide on the rods 18 without any movement on the part of the rods, but when the supporting plate 16 is nested in the cavity 46 in the liquid-applying pad further upward movement of the presser member 24 causes the supporting member 16 to rise therewith. During the downward movement of the presser member 24 from its highest position, the supporting plate 16 descends until the lower ends of the rods 18 are seated on the bottom wall 20 of the casing, whereupon the supporting plate is arrested at its initial level.

To register the soles in the desired relation to the pad 44, the illustrated apparatus is provided with a toe-end gage 52 and two side gages 54 (Figs. 3 and 5) facing each other. The toe-end gage 52 limits the extent to which a sole may be inserted into the conditioning chamber and may be adjusted horizontally toward and from the opening 14 in accordance with the lengths of the soles. The side gages 54 are arranged to engage opposite points on the perimeter of a sole adjacent to the ball portion thereof and they are adjustable toward and from each other in accordance with various widths of soles. To be effective these three gages stand initially between the two sole-pressing members 22 and 24, but the described operating mechanism by which the member 24 is raised is utilized also to retract the three gages from the path traversed by the member 24. Moreover, the gages are so interconnected as to partake of a single adjusting operation common to all of them.

The toe-gage 52 is carried by two parallel rods 56 and 58 (Fig. 3), each of which has an individual bearing in a boss 60 formed on the casing 10. The rod 56 is backed by a compression spring 62 that normally projects the gage toward the supporting plate 16. The rod 58 is provided with rack teeth 64 that engage a gear-segment 66 carried by a rock-shaft 68. An arm 70 rigidly connected to the gear segment by the rock-shaft receives motion from the treadle 40 to which it is connected by a train of mechanism comprising a link 72, a bell-crank lever 74, a rod 76, and a compression spring 78 surrounding the rod. The bell-crank lever 74 is mounted on a fulcrum-pin 80 supported in lugs depending from the casing 10 (Fig. 2). The rod 76 extends through and has sliding connection with fittings pivotally connected to the treadle 40 and the bell-crank lever 74 respectively. The spring 78 is under initial compression in consequence of which motion of the treadle is communicated to the bell-crank lever and thence to the toe-gage 52 to retract the latter during the initial stages of upward movement of the sole-pressing member 24. When the toe-gage 52 has been retracted beyond the path of the member 24 it is arrested by the rear wall of the casing 10, but the spring 78 provides for further movement of the treadle according to the requirements of the sole-pressing member 24.

The side gages 54 are pivotally mounted on fulcrum studs 82 (Fig. 3) screwed into the casing 20 and are normally drawn toward each other by a tension spring 84. They are provided with cooperative gear-segments 86 (Fig. 5) by which they are caused to partake equally of movement toward and from each other. In order that these gages may also be retracted during upward movement of the member 24, the spring 84 maintains one of these gages constantly in contact with a beveled or inclined surface 88 at the upper end of a vertical operating rod 90 that slides up and down in bearings formed in portions of the casing 10. Vertical movement is imparted to this rod by a collar 92 affixed thereto and provided with a peripheral groove 94 for the reception of cylindrical lugs projecting from a forked arm 96 affixed to the rock-shaft 68. Consequently, when the rock-shaft is operated to retract the toe-gage 52 it also raises the rod 90 with the result that the inclined surface 88 of the rod retracts the side gages 54 in opposite directions substantially at right angles to the lines of retractory movement imparted to the toe-gage. Thus, the side gages as well as the toe-gage are removed from the path of the sole-pressing member 24 before the latter rises to their level.

Provision is also made for effecting a simultaneous initial adjustment of the three gages according to the size of a sole. For this purpose, the front of the casing 10 is provided with a rotary unit comprising a spur gear 98, a knob 100 by which to rotate the gear, and a dial 102 bearing a scale of marks or symbols that represent various size gradations. The gear 98 meshes with spur-teeth 104 formed on a nut threaded on a rod 106 extending lengthwise of the casing 10 beneath the bottom 20 thereof. The nut occupies a notch in a boss 108 formed on the front of the casing 10 and arranged to prevent axial movement of the nut but to permit rotation thereof. The boss 108 also furnishes a bearing for the forward end of the rod 106. The rod is adjustable lengthwise, but rotational movement thereof is prevented by a stud 107 affixed to it as shown in Fig. 2. The outer end of the stud slides on a fixed guiding strip 109 arranged in a groove formed in the stud. The rear portion of the rod 106 is arranged to slide in a bearing formed in a boss 110 (Fig. 3) beyond which the rod is provided with a screw-thread that carries an adjustable screw-threaded collar 112 and a binding nut 114. The front end of the collar 112 abuts against a forked arm 116 forming a part of the segment member 66. When the knob 100 is turned in one direction it produces forward movement of the rod 106 with the result that the toe-gage 52 is adjusted toward the rear and the side gages are adjusted away from each other. The adjustable collar 112 provides for coordinating the initial positions of the gages in accordance with the scale on the dial 102. A pointer 118 may be attached to the front of the casing 10 to cooperate with the scale on the dial.

The conditioning liquid may be supplied to both of the casings 10 from a common source of supply, for example a barometric feeder comprising a container 120 entirely closed except at its mouth which is at the bottom thereof. As shown in Figs. 1 and 2, the two casings 10 are connected by an interposed coupling member 122 that not only provides communication between the two sole-conditioning chambers but also provides a mounting for the container 120 and cooperates with the latter to provide a barometric feeder. The spout 124 of the container 120 has an external screw-thread that carries an internally threaded supporting collar 126. An opening is formed in the upper wall of the coupling member 122 to receive the spout 124, the rim or mouth of this opening constituting a support for the collar 126. The lower end of the spout 124 is provided with a closure 128 shown as a cap adapted to be screwed thereon. A discharge opening in the center of the closure 128 is controlled by a valve 130 the purpose of which is to avoid spilling the liquid when the container 120 is being mounted on the member 122 and removed therefrom. The valve 130 is normally seated on the rim of the discharge opening by a light compression spring 132 arranged to surround the stem 134 by which the valve is carried. The stem 134 is arranged to slide in a bearing 136 formed in a spider affixed to the closure 128. The stem 134 projects from the closure 128 far enough to engage the bottom wall of the coupling member 122 before the supporting collar 126 is quite seated on the coupling member. Consequently, the act of mounting the container 120 on the seat provided for its support causes the valve 130 to be opened. Thus, the liquid in the two sole-conditioning chambers will be automatically replenished and maintained approximately at the level of the line $x$, although the level of the liquid will rise and fall slightly in consequence of moving either of the sole-pressing members 24 up and down.

In the operation of the machine, assuming that the containers 120 have been filled with liquid, thus maintaining a body of liquid in each casing in which the pads 44 are submerged, the operator will adjust the gages by rotation of the knob 100 and will introduce a sole 15 through the opening 14 and place it upon the support 16 where it will be brought into registration with the presser members by the end gage 52 and the side gages 54. He will then depress the treadle, lifting the submerged presser member with its liquid carrying pad 44 and at the same time withdrawing the gages. Continued movement of the lower presser member lifts the sole from the support 16 and, carrying it upward, clamps it against the upper presser member 22. In this movement the support 16 is carried along with the lower presser member, under the sole but out of engagement therewith (Fig. 4). As the respective presser members are brought into engagement with the opposite faces of the sole, the conditioning liquid will be applied to the marginal face thereof in a band, keeping the mid-portion dry. The treadle is then released, allowing the lower presser member to descend and leaving the sole supported upon the support 16 in an intermediate position between the presser members. From this position it is removed through the opening 14 by the operator.

Having thus described the invention, what I claim as new and desire to secure by Letters Patent of the United States is:

1. That improvement in methods of preparing soles for attachment to lasted shoes, which consists in applying a band of cement to the margin of the attaching face of a molded sole, allowing the cement to dry, supporting said sole attaching face down by engagement with a middle area of said face without masking a marginal band thereof upon which there is a coating of dried cement, presenting a sponge-like applicator to apply an excessive quantity of a conditioning liquid to said marginal band, and expelling surplus liquid from said applicator without coating said middle area.

2. That improvement in methods of preparing soles for attachment to lasted shoes, which consists in applying a band of cement to the margin of the attaching face of a molded sole, allowing the cement to dry, supporting said sole attaching face down by a middle area of said face without masking a marginal band thereof, elevating an applicator carrying an excessive quantity of a conditioning liquid to said marginal band, and, before the liquid substantially affects the cement, expelling surplus liquid from the applicator while damming the flow inwardly of said band by masking the entire uncemented area.

3. Apparatus for conditioning unattached shoe-soles, comprising an abutment member having the vertical contour of a molded sole, a similarly contoured cooperatively related, substantially annular, sole-clamping member which has an inner boundary smaller than, but of the same general configuration as, the perimeter of at least the forepart of a sole, means arranged to supply a sole-conditioning liquid to the sole-engaging face of the latter member, means arranged to support a sole initially at a level between said members, and operating means arranged to move said cooperatively related members relatively one to the other to lift the sole from the supporting means and to clamp the marginal portion of an interposed sole and to coat said portion with conditioning liquid carried by said one of said members.

4. Apparatus for conditioning unattached shoe-soles, comprising two cooperatively related sole-clamping members arranged one above the other, a sole-supporting member smaller in area than a sole and arranged between said clamping members, the lower one of said clamping members having a recess with a marginal ledge to receive said sole-supporting member in nested relation thereto and below the surface of the clamping member and resting on the ledge, means arranged to supply a sole-conditioning liquid to the sole-engaging face of said lower clamping member, and operating means arranged to move said clamping members and said sole-supporting member relatively one to another to clamp the marginal portion of a sole lying on said sole-supporting member and to coat said portion with conditioning liquid carried by said lower clamping member.

5. Apparatus for conditioning unattached shoe-soles, comprising upper and lower sole-pressing members the lower one of which is formed in accordance with a marginal band of a sole and provided with an opening corresponding to a middle area of a sole, means arranged to support a sole at an intermediate level between said members without masking the marginal portion in register with said lower member, operating means arranged to raise said lower member to elevate the sole from said intermediate level and press the marginal band thereof against said upper member, and means arranged to maintain a body of sole-conditioning liquid for submergence therein of said lower member when the latter is depressed below said intermediate level.

6. Apparatus for conditioning unattached shoe-soles, comprising normally separated upper and lower sole-pressing members shaped to engage substantially all portions of a marginal band of an interposed sole simultaneously, means arranged to support an unattached sole at an intermediate level between said members, positioning members coacting with the perimeter of the sole arranged to register a sole edgewise at said intermediate level, operating means arranged to elevate said lower member to raise a sole from said support to press it against the upper member, and means arranged to supply a sole-conditioning liquid to the sole-engaging surface of said lower member when the latter is below said intermediate level.

7. Apparatus for conditioning unattached shoe-soles, comprising upper and lower sole-pressing members shaped to engage substantially all portions of a marginal band of an interposed sole simultaneously, means arranged to support an unattached sole at an intermediate level between said members without masking said marginal band, one or more gages arranged to register a sole edgewise at said intermediate level by engagement with the perimeter of the sole, operating means arranged to elevate said lower member and retract said one or more gages from its path, and means arranged to supply a sole-conditioning liquid to the sole-engaging surface of said lower member when the latter is below said intermediate level.

8. Apparatus for conditioning unattached shoe-soles, comprising upper and lower sole-pressing members shaped to engage substantially all portions of a marginal band of an interposed sole simultaneously, means arranged to support an unattached sole at an intermediate level between said members without masking said marginal band, an end gage and side gages arranged to register a sole edgewise at said intermediate level by engagement with the perimeter of the sole, operating means arranged to elevate said lower member and retract said end gage and said side gages each in a different direction from its path, and means arranged to supply a sole-conditioning liquid to the sole-engaging surface of said lower member when the latter is below said intermediate level.

9. Apparatus for conditioning unattached shoe-soles, comprising an upper sole-pressing member, an annular lower sole-pressing member having an opening, a movable sole-supporting member formed to enter said opening, means for normally sustaining said supporting member free for upward movement and at an intermediate level between said pressing members, a basin for a sole-conditioning liquid in which said lower pressing member is initially submerged, and operating means arranged to elevate said lower pressing member and said sole-supporting member and thereby press an interposed sole against said upper pressing member and to apply a conditioning fluid to a marginal band of the sole.

10. Apparatus for conditioning unattached shoe-soles, comprising upper and lower sole-pressing members one of which is movable toward and from the other, said movable member being formed to engage a marginal band of a sole without engaging the middle area thereof, a plurality of gages arranged to register a sole edgewise between said members by engagement with various points on the perimeter of the sole, means arranged to supply a sole-conditioning liquid to the sole-engaging surface of said movable member, and operating means arranged to move said movable member toward the other of said sole-pressing members and retract said gages from the registered sole.

11. Apparatus for conditioning unattached molded shoe-soles, comprising a casing forming a closed chamber but having a restricted opening in one of its upright walls for endwise insertion of a molded sole into said chamber, sole-supporting means in said chamber approximately at the level of said opening, a pad opposite one face of said sole and having a curved vertical profile to apply a volatile sole-conditioning liquid to a face of a sole inserted through said opening, operating means arranged to impart liquid-applying motion to said pad, and an abutment having a similar profile opposite the other face of said sole.

12. Apparatus for conditioning unattached shoe-soles, comprising a casing forming a closed chamber but having a restricted opening in one of its upright walls for endwise insertion of a sole into said chamber, means arranged in said chamber to support a sole at a level in register with said opening, and movable applying means under control of the operator to apply a volatile sole-conditioning liquid to a sole placed on said supporting means.

13. Apparatus for conditioning unattached shoe-soles, comprising a casing forming a closed chamber but having a restricted opening in one of its upright walls for endwise insertion of a sole into said chamber, means arranged in said chamber to support a sole at a level in register with said opening, and means under control of the operator to transfer an inserted sole to another level, to apply a volatile sole-conditioning liquid to the sole, and to return the sole to the level first mentioned.

14. A sole-shaped liquid-applying pad of resilient material, the work-engaging surface of said pad being in the form of a band and having an integral, resilient bead defining the inner boundary of said band, said bead normally projecting slightly from the general plane of said surface to form a barrier when brought into engagement with the work whereby the liquid on said band is prevented from flowing across said inner boundary and from coating the mid-portion of a sole.

CHARLES E. HOOD.